United States Patent [19]
Zander

[11] Patent Number: 6,011,922
[45] Date of Patent: Jan. 4, 2000

[54] FILM LOADING METHODS AND APPARATUS USING AN OVERSTRESSED SCROLL FORMER AND FILM HOUSINGS

[75] Inventor: Dennis R. Zander, Penfield, N.Y.

[73] Assignee: Eastman Kodak Company, Rochester, N.Y.

[21] Appl. No.: 08/881,164

[22] Filed: Jun. 24, 1997

[51] Int. Cl.$^7$ .................................................. G03B 17/02
[52] U.S. Cl. ........................... 396/6; 396/538; 242/535.1; 242/548.3
[58] Field of Search ................................ 396/6, 387, 415, 396/512, 516, 535, 538; 242/535.1, 535.4, 547, 548.3

[56] References Cited

U.S. PATENT DOCUMENTS

| | | |
|---|---|---|
| 1,921,559 | 8/1933 | Case . |
| 1,921,560 | 8/1933 | Case . |
| 2,484,248 | 10/1949 | Roehrl . |
| 3,057,573 | 10/1962 | Kindig et al. . |
| 3,288,389 | 11/1966 | Gersch et al. . |
| 4,440,483 | 4/1984 | Linke et al. .............................. 396/415 |
| 4,833,495 | 5/1989 | Ohmura et al. . |
| 4,903,041 | 2/1990 | Light . |
| 5,125,630 | 6/1992 | Hoyt et al. . |
| 5,126,193 | 6/1992 | Light . |
| 5,718,393 | 2/1998 | Serizawa .......................... 242/535.1 X |

FOREIGN PATENT DOCUMENTS

| | | |
|---|---|---|
| 0 520 420 A1 | 12/1992 | European Pat. Off. . |
| 7-5526 | 1/1995 | Japan . |

Primary Examiner—Howard B. Blankenship
Attorney, Agent, or Firm—Robert Luke Walker

[57] ABSTRACT

Film loading methods and apparatus using an overstressed scroll former and film housings. In the methods, a filmstrip is loaded into a housing and the filmstrip is propelled into the housing. During the propelling, the filmstrip is curled into a roll within a scroll former radially compressing the roll. The scroll former is overstressed during or after the curling.

26 Claims, 7 Drawing Sheets

FILM LOADING METHODS AND APPARATUS USING AN OVERSTRESSED SCROLL FORMER AND FILM HOUSINGS

FIELD OF THE INVENTION

The invention relates to photographic equipment and methods and more particularly relates to a film loading methods and apparatus using an overstressed scroll former and related film housings.

BACKGROUND OF THE INVENTION

A wide variety of cameras, film cassettes, bulk film containers and the like store a long, relatively narrow filmstrip as a cylindrical film roll. (The terms "film" and "filmstrip" are used herein to refer to the same physical article. "Film" is used as the more general term. "Filmstrip" is used where it is desired to emphasize that the film, when unrolled, has the form of a long, narrow rectangle. The term "film supply" is used to refer to the camera, cassette, or container that holds the filmstrip. The roll of film is, in many cases, wound around a central spool or core. In other cases, the core is deleted in an effort to reduce expense, complexity, and weight and the film is in the form of a coreless scroll or "roll".

Rolls can be formed by simply transporting a filmstrip into a cylindrical or similarly shaped storage container or camera film chamber. For example, a variety of cameras are known in which a film roll is formed by prewinding unexposed film from a cartridge or spool. U.S. Pat. No. 1,921,559 and U.S. Pat. No. 1,921,560 teach thrust cartridge cameras which prewind to an empty roll chamber having generally concave walls. This approach has the advantage that handling of the roll is minimized, since the roll is formed in situ. This approach has the problem that it tends to require the use of a filmstrip having specific curling properties and becomes problematic when the length of the filmstrip is increased.

A solution to this problem is using an appliance to help shape the scroll as it is formed. Scroll forming methods using appliances can be roughly categorized into methods using appliances acting external to the scroll, methods using appliances acting internal to the scroll, and methods using a combination of internal and external appliances. External-acting appliances have the advantage that the film does not need to be attached to the appliance during film scrolling. The following references teach methods and apparatus in which an external-acting appliance is used.

U.S. Pat. No. 3,057,573 teaches a camera having roll chamber defined by three opposed rollers, which resiliently move apart as the roll diameter is increased. One of the rollers is fixed. The other two are mounted in a movable carrier. U.S. Pat. No. 4,440,483 teaches a camera having a roll chamber defined by curved walls and an arcuate lever. The lever is spring biased to bear against a film roll within the chamber. U.S. Pat. No. 3,288,389 teaches the formation of a roll in a film cartridge within a resilient band of rubber of the like. The band may be lined by foil or other flexible material. U.S. Pat. No. 2,484,248 teaches a similar cartridge having a metal spring. In each of these approaches, the film roll is subject to the compressive force of the springs or resilient band during film use. This compressive force is undesirable, since it puts the rolled filmstrip at risk of scratching.

One-time use cameras are commonly recycled by replacing old front and back covers, but reusing many or all internal parts. In many cases the parts defining a film scroll chamber are reused. This presents a risk that the film scroll chamber will have been damaged or contaminated so as to scratch the reloaded film.

It would thus be desirable to provide a film housing having means for holding a film roll that subjects the film roll to low compressive force during film use and, independent of the rest of the film housing, is not reusable; and related methods and apparatus.

SUMMARY OF THE INVENTION

The invention is defined by the claims. The invention, in its broader aspects, provides film loading methods and apparatus using an overstressed scroll former and film housings. In the methods, a filmstrip is loaded into a housing and the filmstrip is propelled into the housing. During the propelling, the filmstrip is curled into a roll within a scroll former radially compressing the roll. The scroll former is overstressed during or after the curling.

It is an advantageous effect of at least some of the embodiments of the invention that methods and apparatus are provided for loading a film housing having means for holding a film roll that subjects the film roll to low compressive force during film use and, independent of the rest of the film housing, is not reusable.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the methods of the invention, a filmstrip is propelled into a housing and curled into a roll within a scroll former that applies a substantially radial compressive force against all or a large portion of the roll surface as the roll forms. The scroll former is resilient, but during or after curling of the roll, or both; the scroll former is overstressed. Afterward, the completed roll is subject to a substantially radial compressive force imposed by the scroll former that is less than the compressive force applied during film loading. This makes subsequent transport of the film easier and reduces the risk of film scuffing. The housing of the invention includes a body, the overstressed scroll former, and a film roll disposed in the scroll former. The housing can be the supply chamber of a camera or a film container or a cassette or other article for storing photographic film. The film source can be a bulk roll or a shorter film roll or a film cartridge 30. The invention is particularly useful in relation to cameras and is generally discussed below in terms of prewinding a filmstrip from a cartridge 30 into the supply chamber of the camera frame assembly of the invention. It will be understood, however, that the invention is not limited to the embodiments discussed and that considerations similar to those discussed herein are applicable to other embodiments. The term "camera frame assembly" is used here to refer to a complete camera or an incomplete subunit of a camera that will later be assembled with other parts to form a complete camera. The invention is particularly advantageous in relation to a camera frame assembly that is a completed or incomplete one-time use camera. The film loading assembly of the invention includes the housing, a filmstrip source and a film transport.

In a particular embodiment of the invention, the scroll former inelastically deforms during the curling of the filmstrip. The scroll former has a relaxed conformation, prior to curling, in which the scroll former is curved into a coil having about one and one-half turns. After curling, the scroll former curves through less than a complete turn in a relaxed conformation and defines an arc having about the same radius as the completed roll.

Referring now to FIGS. 1–5, the film loading assembly 10 prewinds a filmstrip 12, in a darkroom, into a roll 100 in a camera frame assembly 14. The camera frame assembly 14 includes a camera frame 16 having a cartridge chamber 18 and a supply chamber 20. The camera frame 16 has an intermediate section or exposure frame 22 between the chambers 18,20. The cartridge chamber 18 has a rearwardly facing throat or opening 15. The back of the supply chamber 20 is closed, except for a throat or film gap 17. The supply chamber 20 can have end openings (not shown) or continuous end walls 21. The scroll former or film scroller 26 is present in the supply chamber 20.

A film cartridge 30 is loaded into the frame assembly 14. The cartridge 30 includes a canister 32, a spool 34, and the filmstrip 12. The filmstrip 12 has a leading portion 38 having a free end 40, a tail portion or trailing portion 42, which is attached to the spool 34 in the canister 32, and a main portion 44 between the leading and tail portions 38,42. Prior to film loading, the main and trailing portions 44,42 of the filmstrip 12 are wound around the spool 34 in the canister 32. For thrust cartridges 30, the leading portion 38 is also wound around the spool 34.

The supply chamber 20 has a sidewall 24 that defines a supply space 19. The configuration of the supply space 19 is not important to the invention, with the exception that the supply space 19 is preferably large enough to accommodate the film roll without deformation. The frame assembly 14 lacks a film spool 34 or other axial film support, thus the film space 27 is empty, and remains empty after loading, except for the film roll 100 and scroll former 26.

The supply chamber 20 has a medial or first projection 50 and an opposed distal or second projection 52. The projections 50,52 face each other and define the throat 17 of the supply chamber 20. The separation of the projections 50,52 is less than the diameter of the final film roll 100 and the diameter of the final roll space 102 occupied by the final film roll 100 after film loading. One or both of the projections 50,52 can include a guide portion or guide 49, positioned to direct the leading end 38 of the filmstrip 12 into the supply chamber 20 during film transport. In the embodiments of the invention shown in the figures, the guides 49 of the projections 50,52 overlap and the film gap 17 opens toward the intermediate section 22.

The frame assembly 14 defines a rear opening or rear accessway (indicated by dashed line 28 in FIG. 3) over the supply chamber 20 and, preferably over both chambers 18,20 and the intermediate section 22. In a particular embodiment of the invention, the supply chamber 20, including the opposed end walls 21, and projections 52a,52b is a unitary plastic casting.

The scroll former 26 is elongate and has opposed free and fixed ends 46,48 and a main section 56 between and, preferably, continuous with the ends 46,48. The fixed end 48 is attached to the second projection 52 at about the midpoint of the supply chamber 20 in a direction parallel to the rear opening 28. The manner of attachment of the scroll former 26 to the projection 52 is not critical. For example, the scroll former 26 can be adhered by use of adhesive or mechanically attached by hook and loop fastener. It is preferred that the attachment means used not present a risk of snagging or otherwise damaging the filmstrip 12. The scroll former 26 remains attached during film scrolling and, preferably, remains attached during film usage. The scroll former 26 can be made readily replaceable, for example, by use of removable adhesive or hook and loop fastener; to permit removal of a used scroll former 26b from a camera frame assembly or other housing after film usage, followed by replacement of with an unused scroll former 26a and film reloading.

The scroll former 26 has the shape of a curved band. The amount of curvature depends upon whether the scroll former 26 is unused (also referred to herein as an unused or replacement scroll former 26a) or used (also referred to herein as a used or film containing scroll former 26b). The unused scroll former 26a has a relaxed configuration, shown in FIG. 1a, in which an curved inner surface 53 defines an initial roll space 102a that is smaller than a final roll space 102b defined by curved inner surface 53 of the used scroll former 26b. It is preferred that the unused scroll former 26a has a curvature that is geometrically mappable onto the innermost turn 63 of a desired film roll 100 or is smaller in diameter. In other words, the scroll former 26 preferably defines an initial roll space 102a that has about the same volume as the hollow core 67 of the completed film roll. The unused scroll former 26a preferably deflects during loading such that the roll space 102 expands in synchronism with the growth of the roll and adjoining turns of the film roll do not move relative to each other during roll formation.

After the filmstrip 12 has been loaded (discussed below) the scroll former 26 is curved in a cylindrical arc and is preferably undistorted by the interior wall 24 of the supply chamber 20. The scroll former 26 defines and curves most of the way around the roll space 102 and partially enwraps the film roll 100. The scroll former 26 has an inner surface 53 that adjoins the outermost turn of the completed film roll 100. At the time of film loading, or afterwards; the scroll former 26 is overstressed, resulting in the used scroll former 26b. The used scroll former 26b can very loosely grip the film roll 100 or can grip the film roll 100 with moderate resilience. The resilience of the used scroll former 26b is insufficient to allow the used scroll former 26b to retract into the configuration of the unused scroll former 26a after the filmstrip has been removed from the roll space 102.

In the embodiment shown in the figures, the unused scroll former 26a is curved such that a terminal part 65 of the unused scroll former 26a, including free end 46, is overlapped by an outer section 65 of the unused scroll former 26a in a relaxed configuration. The length or circumferential dimension of the unused scroll former 26 and resulting overlap is a function of the required size of the used scroll former 26b. The used scroll former 26b should extend around the film roll 100 sufficiently to hold the film roll in place. Any additional length is superfluous and can be detrimental, since an overlapped free end 46 must move relative to a film roll 100 during film loading and that movement presents a risk of film scuffing. Unnecessary additional length of the scroll former 26 can also resent a detriment if the used scroll former 26b is long enough to allow reuse of he used scroll former 26b. A risk would be presented that the camera frame assembly 14 might be recycled without replacement of the used scroll former 26b. The filmstrip might not fully load, in which case the film loading equipment could jam or be damaged. The filmstrip might fully load, but if so, the filmstrip would compress during loading, moving the turns of the film roll repeatedly past each other and likely damaging the filmstrip.

Figure 1A:
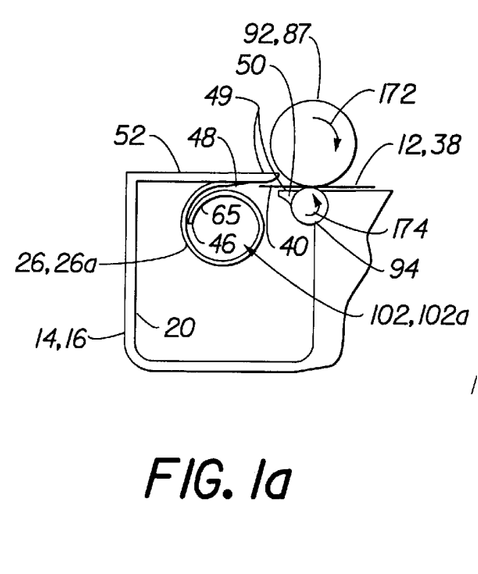
FIGS. 1a–1c are semi-diagrammatical partial views of an embodiment of the apparatus and an embodiment of the camera frame assembly of the invention at different stages in the method of the invention.
Figure 1B:
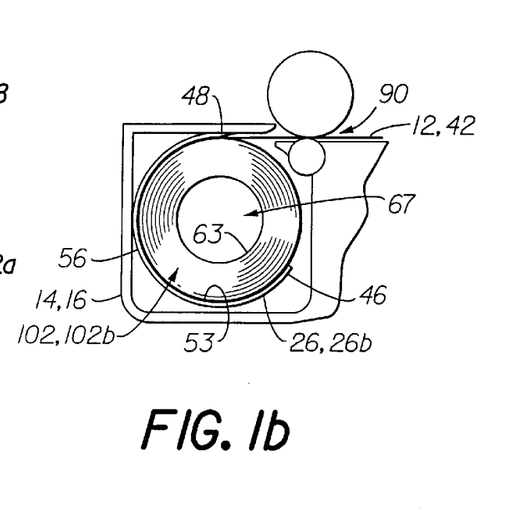
Figure 1C:
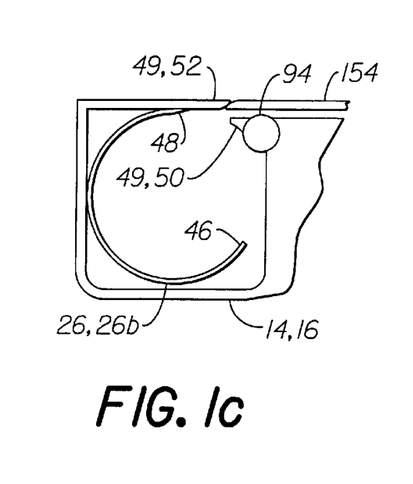

The used scroll former 26b, in the embodiment shown in the figures, has a relaxed configuration, shown in FIG. 1c, that is about the same as when the film roll 100 is present in the roll space 102. This embodiment can be further illustrated by the following specific example. A particular camera is configured to expose a filmstrip having picture areas or exposure frames with a frame-to-frame length of 38 mm. Filmstrips for use with the camera have a trailing portion at one end, 1 frame long; and a leading portion at the other end, 2 frames long. The length of the main portion is varied to provide a desired number of photographs. For 12 exposures, the filmstrip length is 570 mm. For 24 exposures, the filmstrip length is 1026 mm. For 36 exposures, the filmstrip length is 1482 mm. The filmstrip has a thickness of 0.0055 inches (0.14 mm). The film roll 100 has a final diameter of 20.19 mm. The initial roll space has a diameter of 17.5 mm for the 12 exposure filmstrip, a diameter of 15 mm for the 24 exposure filmstrip; and a diameter of 12 mm for the 36 exposure filmstrip. In all cases, the scroll former has a relaxed diameter of 18 mm or greater after film loading and removal.

The wide variety of different types of material can be used in the scroll former, such as polymers, metals, and composites. The physical features of the material, thickness, three dimensional shape, and other parameters can be selected and modified to provide the above-described scroll former characteristics. The materials used determine whether the scroll former 26 is overstressed during loading or is overstressed after loading. For example, metallic or metallic alloy scroll former composed of one or more of the following elemental metals: copper, tin, and lead; would overstress during film loading. Alternatively, a scroll former of some thermoplastic polymers, which would not be overstressed by film loading at room temperature, can be heated after loading to lower the elastic limit and overstress the film scroller resulting in permanent deformation which remains after subsequent cooling. Excessive heating is undesirable, since it presents risks of the scroll former sticking to the filmstrip and localized overheating accompanied by scroll former flow and distortion.

Figure 9:
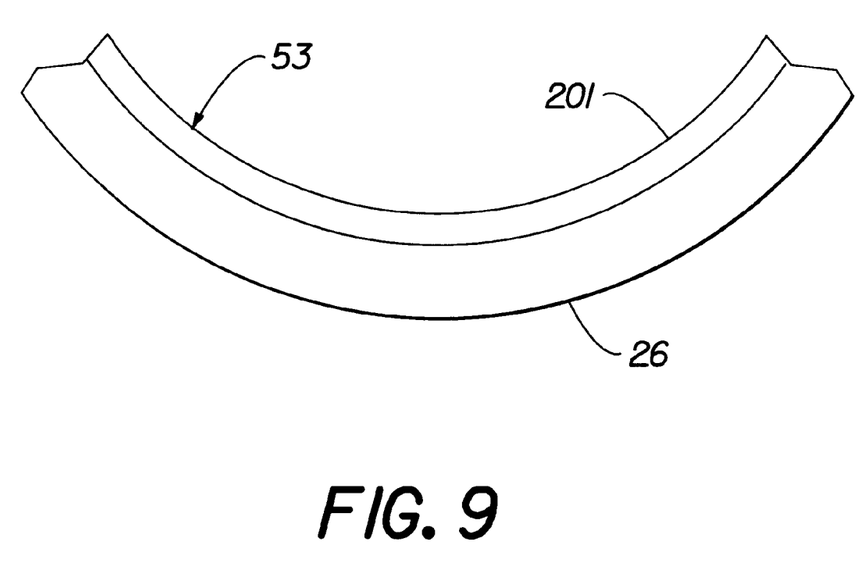
FIG. 9 is a partial enlargement of the view of FIG. 2 and shows a portion of the scroll former 26 of other embodiments of the invention. This figure is diagrammatical and dimensions may be exaggerated.

Referring now particularly to FIG. 9, the inner surface 53 of the scroll former 26 in contact with the filmstrip should have a low coefficient of friction, so as to allow easy movement of the filmstrip and reduce the risk of scratching. The scroll former 26 have multiple layers or coatings 201 for this and other purposes. For example, the inner surface of a support portion or substrate (not separately illustrated) of the scroll former can be coated with a uniform coating 201 of low friction material such as polytetrafluoroethylene to provide a lower coefficient of friction than would be provided by the uncoated support portion. The inner surface can also be covered with a coating 201 including a low friction matting material such as a layer of polymer having beads of low friction material embedded in a layer of polymer material that is thinner than the average diameter of the beads. The beads thus provide a low friction material and smaller surface area in contact with the filmstrip. Suitable bead sizes are an average size in the range of from about 3 to about 25 micrometers. Coatings, matting materials, and procedures related to applying those materials to thin sheets are well known. For example, low friction beads and coatings are described in U.S. Pat. No. 5,126,193 and U.S. Pat. No. 4,903,041. The coatings, 201 including any beads, should be selected to be substantially inert to photographic emulsions.

Figures 3, 4:
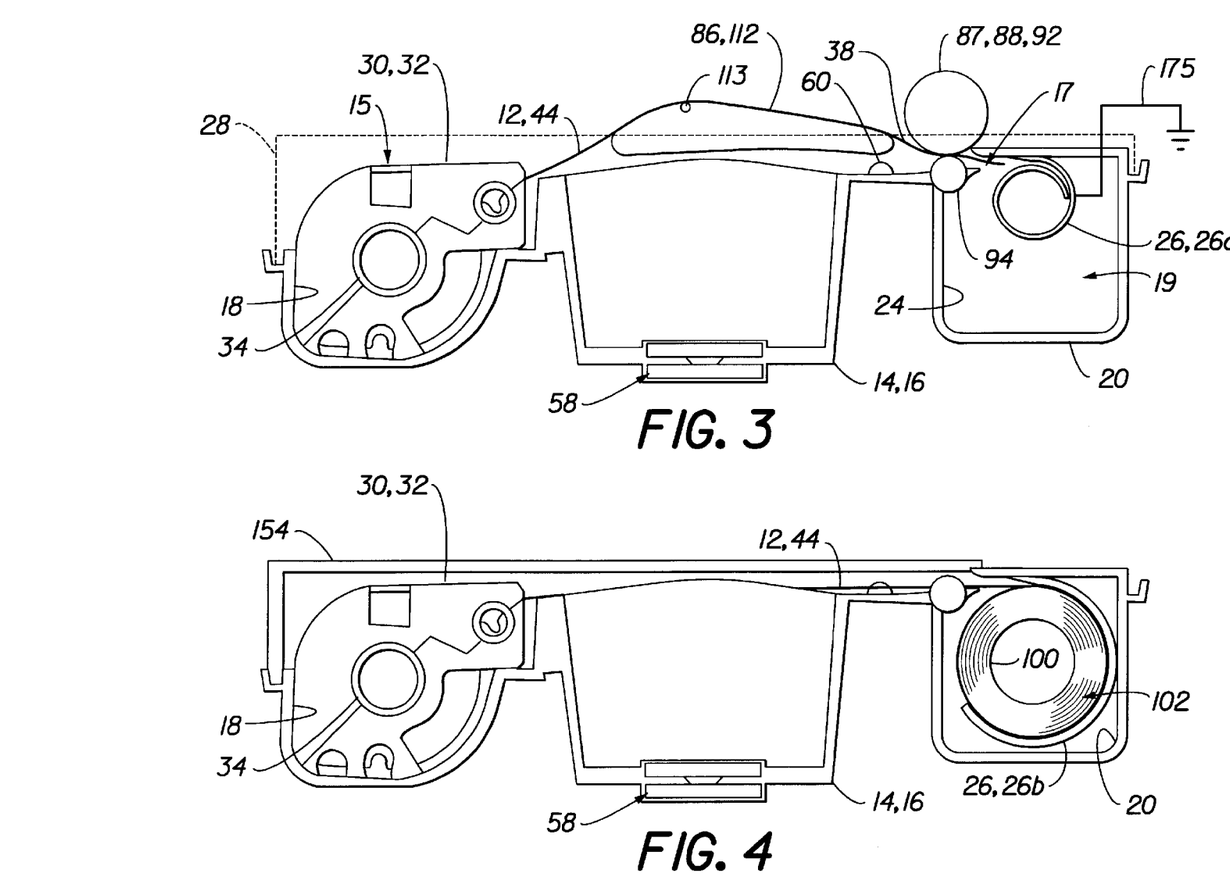
FIG. 3 is the same view of the camera frame assembly as shown in FIG. 2, but with the film bridge of an alternative embodiment of the apparatus.
FIG. 4 is the same view of the camera frame assembly as shown in FIG. 3, after film scrolling and installation of the back cover closing the rear opening.

Metallic sheet or a composite material including metallic sheet and one or more layers of plastic or paper or the like, is convenient for the scroll former and can be utilized for additional purposes. Referring particularly to FIGS. 3 and 9, the metallic layer 201 can be grounded (discharged) during film loading to prevent static charge build-up (a grounding line 175 is illustrated diagrammatically in FIG. 3). The metallic scroll former can also provide a degree of x-ray protection for the film roll prior to use. A specific example of a metallic scroll former is made of 0.007 inch (0.18 mm) thick soft (ductile: 35–50 percent elongation) copper and shaped to define an initial roll space 12 mm in diameter and, after use, having a relaxed diameter of about 17 mm. The free end of the scroll former, in the relaxed conformation after use, defines an imaginary line extending to the a plane defined by the throat or rear opening. The line and plane intersect at an angle of less than about 80 degrees. If an attempt was made to reuse this scroll former after a first use, a filmstrip pushed into the used scroll former would not form a loop.

The camera frame assembly 14 can also include other camera components which have been previously installed on the camera frame 16. For example, the camera frame assembly 14 can include an exposure system 58, including one or more sub-components such as a baffle, a lens system, and a shutter. The frame assembly 14 can include a camera film drive having a film engagement member (indicated diagrammatically in FIG. 2 by a semicircle 60) which adjoins the intermediate section 22 and engages film perforations (not shown) for film metering or both film metering and film transport. A variety of such camera film drives are well known to those of skill in the art. In such drives, the film engagement member can be a linearly reciprocated pawl; however, a sprocket is more commonly used as the film engagement member. In many film drives for type 135 (35 mm.) film, the sprocket is a continuously toothed wheel. The sprocket rotates with film movement; but, at all times, part of the sprocket extends rearward from the intermediate section 22. In some film drives for APS film, for example, in Japanese Kokai 7-5526, filed Jun. 14, 1993, the film engagement member is a skater or incompletely toothed sprocket in which an oval wheel has a pair of teeth at each end of the long axis and a toothless portion at each end of the short axis. With some film transport mechanisms, such as conventional sprocket types, it is necessary to lift film above the sprocket or other film engagement member during prewinding. With other film transport mechanisms, such as some skater types, the film can move past the skater or other film engagement member without causing it to rotate or otherwise actuate. The apparatus and method of the invention, in different embodiments, can accommodate either type of film transport mechanism.

The apparatus 10 of the invention includes a receiver 62, and active components 64 for cartridge loading, film transporting, and film rolling. The receiver 62 supports the camera frame assembly 14 or other housing in a predetermined loading position 14a or series of positions 14a relative to the active components 64. The receiver 62 has a predetermined relationship to other components 64 and thus, during assembly, defines a predetermined relative location or site for each of the chambers 18,20, throats 15,17, intermediate section 22, and rear opening 28. (Sites correspond to features of the frame assembly 14 and are necessarily predetermined for a particular frame assembly 14 by adjusting physical constraints such as relative positions of the receiver 62 and other components 64 of the apparatus 10.) The receiver 62 can accept the camera frame assembly 14 directly or can be adapted to accept a pallet or nest 66 or the like. In that case, the camera frame assembly 14 is held in a predetermined relation to the pallet 66, which in turn in held in a predetermined loading orientation by the receiver 62. Indexing features 68 can be provided on the pallet 66 to permit the camera frame assembly 14 and the receiver 62 to be readily aligned. The frame assembly 14 can be provided to the receiver 62 premounted on a pallet 66 or the pallet 66 and frame assembly 14 can combined on the receiver 62.

Figure 5:
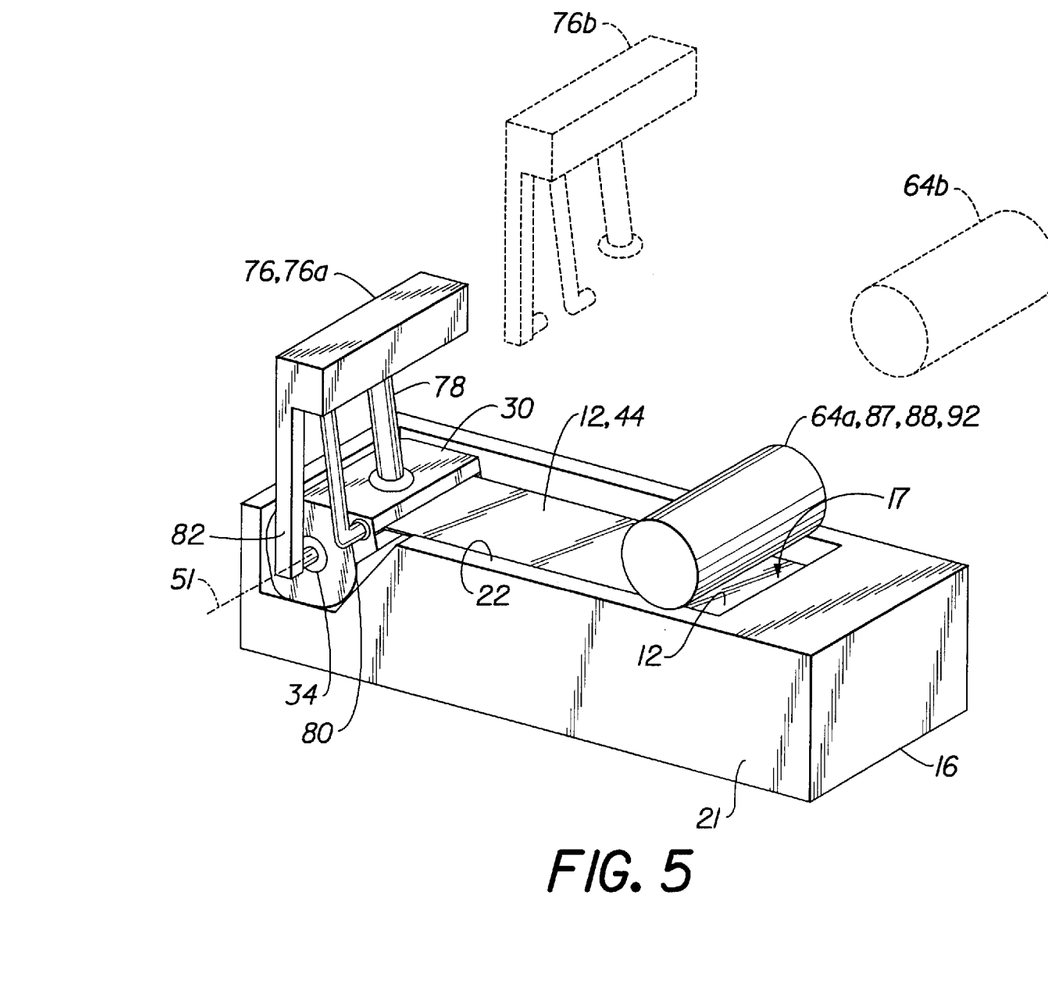
FIG. 5 is a semi-diagrammatical perspective view of still another embodiment of the apparatus and camera frame assembly of the invention. For clarity, the receiver is not shown and the bottom of the cartridge chamber has been deleted. The film bridge and cartridge mover are shown in a use position in solid lines and in a non-use or rest position in dashed lines.
Figure 6:
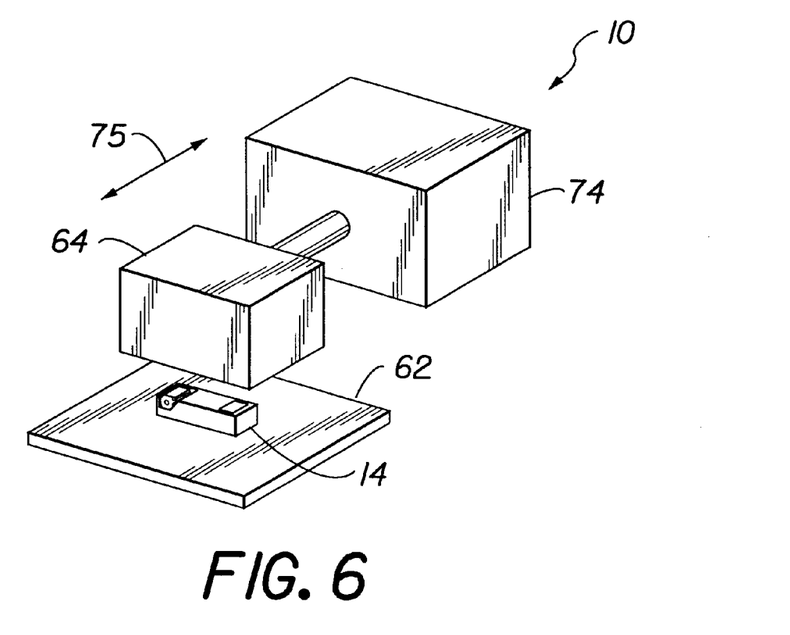
FIG. 6 is a semi-diagrammatical perspective view of another embodiment of the apparatus of the invention.
Figure 7:
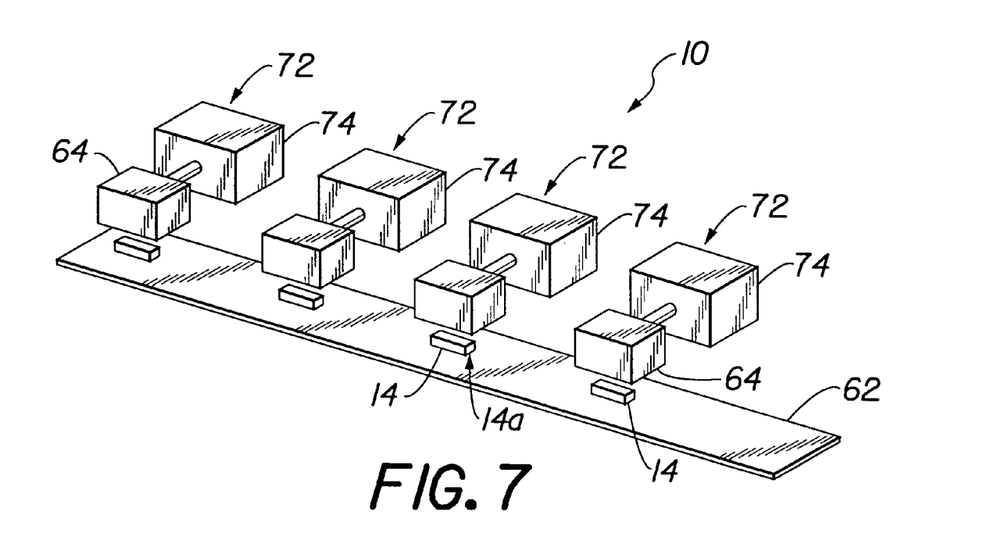
FIG. 7 is a semi-diagrammatical perspective view of still another embodiment of the apparatus of the invention.
Figure 8:
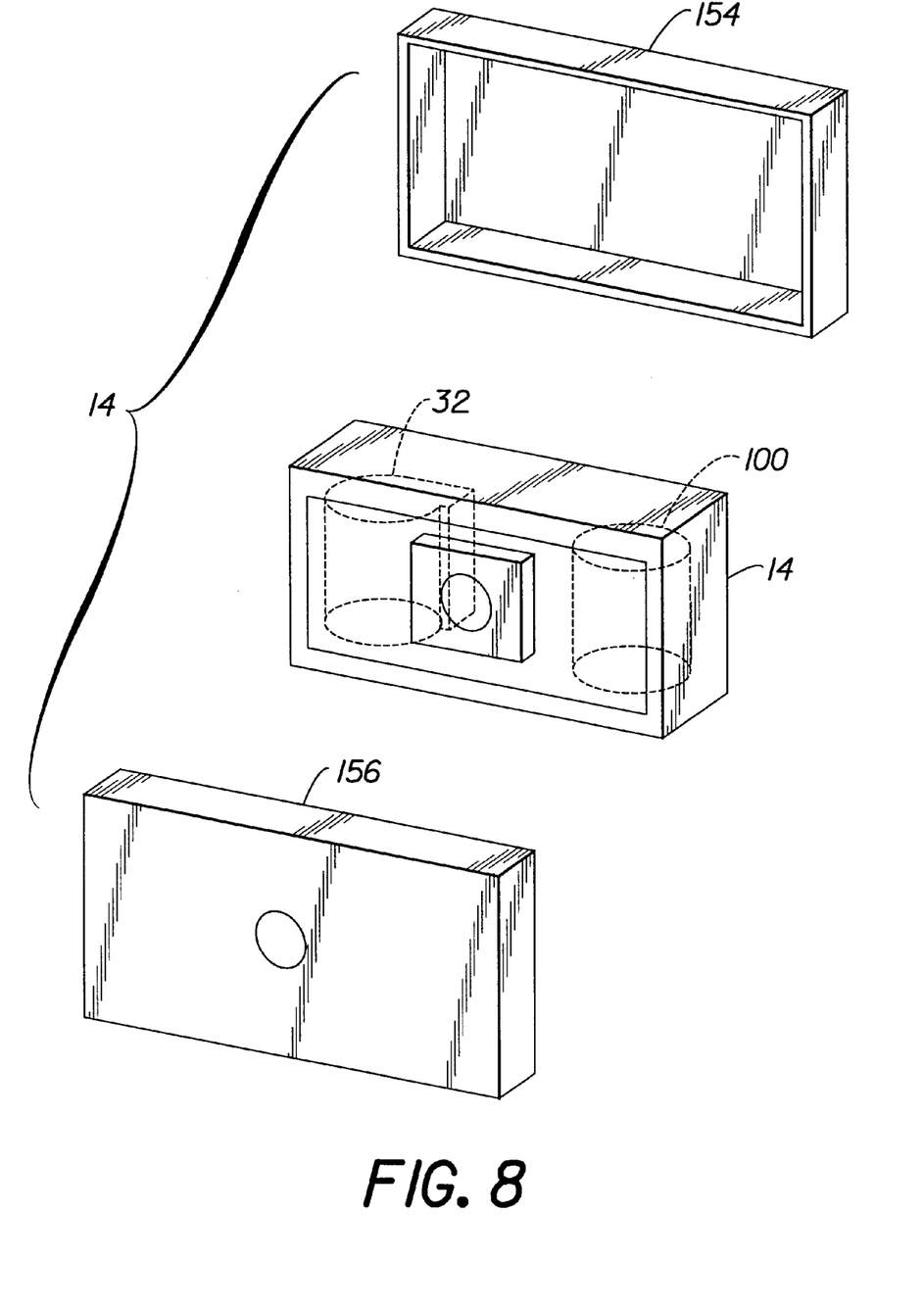
FIG. 8 is an exploded perspective view of another embodiment of the camera frame assembly of the invention.

The receiver 62 can have a variety of features for supporting automated assembly operations. For example, the receiver 62 can include a movement system or positioner 70, for moving a camera frame assembly 14 between the apparatus 10 of the invention and one or more other assembly stations or between stations 72 having different components 64 of the apparatus 10 of the invention. For example, in FIG. 1, the positioner 70 (illustrated schematically) can be a conveyor or track for moving the camera frame assembly 14 in directions perpendicular to the plane of the figure. The apparatus 10 components 64 can each include an actuation mechanism 74 such as a retraction-extension unit to allow the component 64 to extend to an active position for use and to retract to a store position clear of the movement system 70 between actuations. (Directions of movement for one component 64 are indicated in FIG. 5, by double-headed arrow 75.) The actuation mechanism 74 can also include other parts for imparting motion to component 64, such as rotary or linear drives. As a matter of convenience, the discussion herein generally treats the receiver 62 as being static relative to other components 64 of the apparatus 10 of the invention.

Referring now primarily to FIG. 4, the apparatus 10 can include a cartridge mover 76 for positioning the cartridge 30 in the cartridge chamber site. The cartridge mover 76 can be simply a pick and place mechanism or can provide additional functions. In the embodiment of the invention shown in FIG. 5, the cartridge mover 76 has a vacuum gripper 78 which allows the cartridge mover 76 to position the cartridge 30 in the site of the cartridge chamber 18. The vacuum gripper 78 or a holddown (not shown) can be used to retain the cartridge 30 in the cartridge chamber 18 during film winding, if the camera frame assembly 14 lacks features to prevent oscillation or other movement. In this embodiment, the cartridge mover 76 also supports an active light lock opener 80 and a spool rotator 82. The active light lock opener 80 pivots to open the active light lock of a suitable film cartridge 30, such as an Advanced Photo System™ (APS™) cartridge, prior to placement of the cartridge 30 in the cartridge chamber site. This allows the camera frame assembly 14 to include a detent (not shown) which retains the active light lock in the open position prior to cartridge removal for processing. The spool rotator 82 engages the spool 34 of the APS cartridge 30 and rotates the spool 34 to thrust film from the cartridge 30.

The apparatus 10 defines a film path 84 extending from the site of the cartridge chamber 18 to the site of the supply chamber 20. (In FIGS. 1–2, 4, the film path 84 is occupied by the filmstrip 12; and a film bridge 86 is disposed over the intermediate section 22 and defines parts of the film path 84.)

The apparatus 10 has a film transport 88, disposed in operative relation to the film path 84, to propel the filmstrip 12 along the film path 84 to the throat 17 of the supply chamber 20. The film transport 88 can use a driven roller, or belt, or other conventional film transport device to move the film along the film path 84. With a thrust-type film cartridge 30, a spool rotator, like that previously discussed, can also be utilized.

The use of a film bridge 86 is preferred in embodiments of the invention in which the camera film drive has a film engagement member 60, such as a conventional sprocket, that continually extends into the intermediate section 22. The film bridge 86 causes the film path 84 to be spaced apart from the intermediate section site and separates the filmstrip 12 from the engagement member 60 of the camera film drive, which thus does not need to be disabled or the like during roll formation. In some other embodiments, the film engagement member 60, is a skater or the like and can be positioned so as to not extend into the intermediate section 22 during film winding. In these embodiments the use of a film bridge 86 is not mandatory, since film winding through the intermediate section 22 will pass freely over the film engagement member 50. A frame assembly 14 having film retention fingers can be used. Such a frame assembly is disclosed in U.S. patent application Ser. No. 08/796,155, entitled "ONE-TIME-USE CAMERA HAVING MAIN BODY PART AND INSERTABLE LIGHT BAFFLE WITH FILM HOLDERS TO FACILITATE CAMERA ASSEMBLY", filed Feb. 6, 1997, by Douglas H. Pearson, which is hereby incorporated herein by reference. The film retention fingers define and guide the filmstrip 12 along part of the film path 84 into the film gap 17.

The film bridge 86 can take a variety of forms. The film bridge 86 can include the film transport 88, or the bridge 86 can be separate from the film transport 88, or the film transport 88 can have multiple drive elements with one or more incorporated in the film bridge 86 and one or more separate from the film bridge 86. The figures illustrate some different film transports 88 and film bridges 86.

In FIGS. 1a–1c and 5, no film bridge 86 is used and the film transport 88 is a capstan drive 87 with the nip 90 between first and second capstan rollers 92,94 disposed at about the level of the film plane in the resulting camera. The lower capstan roller 94 is permanently mounted in the camera frame assembly. The lower capstan roller 94 is divided into two sub-rollers (not shown) that contact only the edges of the filmstrip. The guide 49 of the second projection 52 is disposed between the two sub-rollers. The capstan rollers 92,94 rotate in the directions indicated by arrows 172,174. The camera frame assembly 14 can, alternatively, include a top opening allowing a lower or second capstan roller (not separately illustrated), that is commonly mounted with the upper capstan roller 92, to enter the frame assembly 14 and assume a use position for film transporting.

Figure 2:
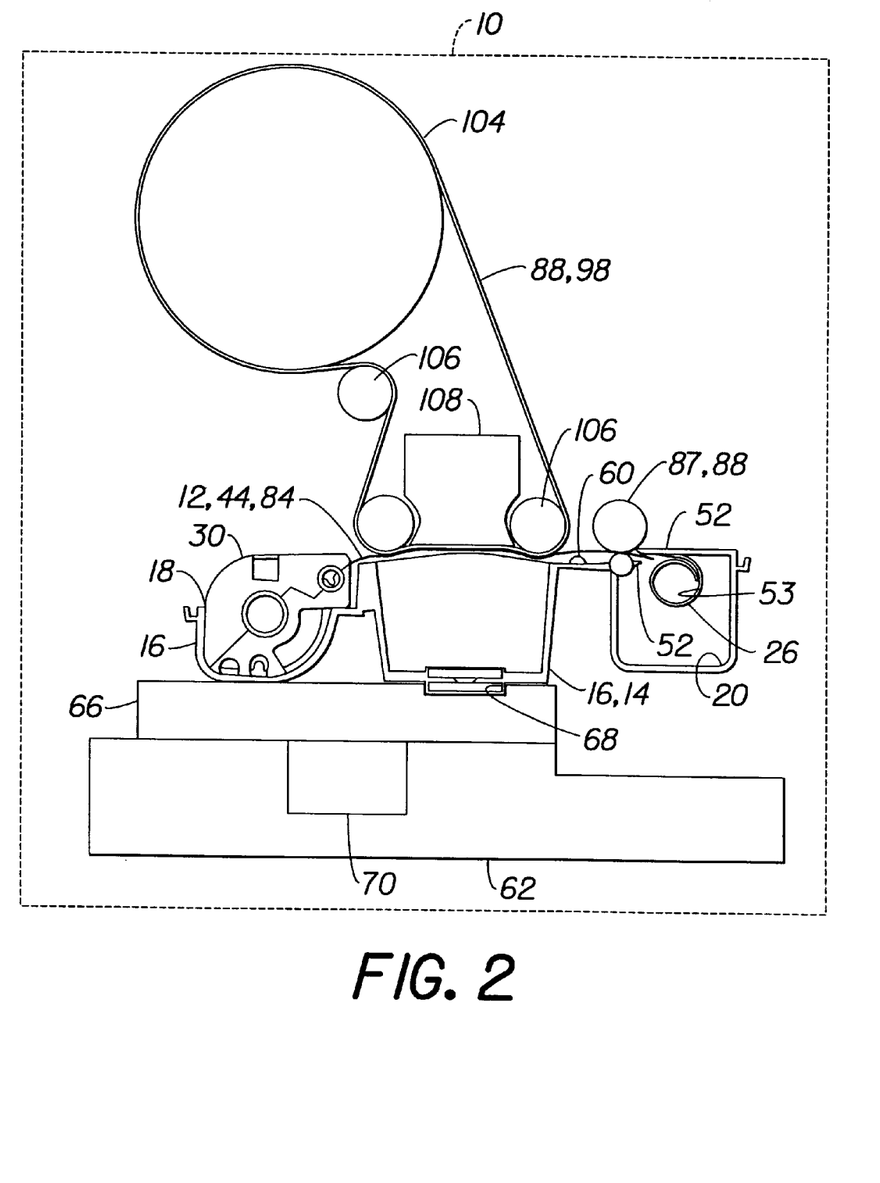
FIG. 2 is a semi-diagrammatical view of an embodiment of the apparatus of the invention, showing a receiver and film bridge. A pallet rests on the receiver. The pallet bears another embodiment of the camera frame assembly (shown in cross-section) and a cartridge.

In FIG. 2, a film bridge 86 in the form of an endless-belt mechanism is positioned over the intermediate section 22 of the camera frame assembly 14. The endless belt 98 can be disposed between the filmstrip 12 and the intermediate section 22 of the camera frame assembly 14 or, as shown in FIG. 1 can overlie the filmstrip 12. The mechanism 42 includes a belt drive 104 and idlers 106 which position and tension the belt 98. An endless belt 98 overlying the filmstrip 12 can have holes (not shown) and include a vacuum-compressed gas unit 108 which provides a vacuum to pull the filmstrip 12 against the belt 98 for transport, and directs compressed gas against the filmstrip 12, or uses gravity to release the filmstrip 12 from the belt 98. The film drive includes the belt drive of the endless-belt mechanism and a separate capstan 87 adjoining the supply chamber 20. As in FIG. 5, the capstan 87 defines a nip 90 between first and second capstan rollers 92,94 disposed at about the level of the film plane in the resulting camera.

A similar embodiment is shown in FIG. 3, but in this case the endless belt mechanism is replaced by a turtleback 112. It is preferred that the turtleback 112 present minimal friction to the filmstrip 12. The turtleback 112 can provide one or more friction reducing features (indicated by item 113 in FIG. 2); such as holes and a pressurized gas connection to create in air cushion, or rotary bearings. Another example of a suitable film bridge 86 is a vacuum shuttle, such as that disclosed in U.S. Pat. No. 5,125,630.

The film bridge 86 can be permanently positioned relative to the receiver 62 or a positioner 70 can be provided for moving the film bridge 86 relative to the receiver 62, between a use position over the intermediate section site and a rest position spaced apart from the use position. Other components 64, such as a cartridge mover 76, can be repositioned in the same manner between active and rest positions 76a,64a and 76b,64b, respectively.

The film transport 88 can include one or more guides or guide members (not shown) positioned to direct the filmstrip 12 into the supply chamber 20. One of both of the guides 49 can, similarly, be provided as part of the loading apparatus rather than the camera frame assembly 14. The guides are preferably centrally relieved or otherwise configured to eliminate or minimize contact with the image area of the filmstrip 12.

Referring now to the embodiment of the method of the invention shown in the figures, a film cartridge 30 is first gripped and placed in the cartridge chamber 18 of the camera frame assembly 14. The cartridge mover 76 can simply place a film cartridge 30 in the cartridge chamber 18 or can pick up a cartridge 30 from a supply (not shown), move the cartridge 30 to the cartridge chamber 18, and then continue to grip or otherwise retain the cartridge 30 in position until film winding is completed. This is convenient if the camera frame assembly 14 lacks features to prevent oscillation or other movement of the film cartridge 30 during film winding. An active light lock opener 80 can be pivoted to open the active light lock of a suitable film cartridge 30, such as an Advanced Photo System™ (APS™) cartridge, prior to placement of the cartridge 30 in the cartridge chamber site. This allows the camera frame assembly 14 to include a detent (not shown) which retains the active light lock in the open position during film use.

The filmstrip 12 is advanced by the film transport 88 from the cartridge 30 along the film path 84, and the free end 40 of the filmstrip 12 enters the supply chamber 20. The filmstrip 12 is propelled into the supply chamber 20 by the film transport and curls against the scroll former 26, which expands to accommodate the growing film roll. The manner in which the film transport propels the filmstrip varies with the film type and the characteristics of the camera frame assembly. With a thrust type film cartridge, such as an APS cartridge, the spool rotator 82 engages the spool 34 of the cartridge 30 and rotates the spool 34 to thrust the filmstrip 12 from the cartridge 30. The film transport 88 can be limited to the spool rotator or can include another mechanism, such as a capstan, that takes over for or operates with the spool rotator 82. Depending upon the film drive of the camera frame assembly 14, as discussed above, a film bridge 86 can be positioned over the intermediate section 22 of the frame 16.

Friction reduction can be provided on the film path 84. For example, air can be blown through holes in the vacuum/air belt 98 of a film bridge 86 to provide an air cushion. Film transport is continued until the main portion 44 of the filmstrip 12 has been wound onto the forming film roll. The remaining or trailing portion 42 of the filmstrip 12 remains attached to the spool 34 in the film cartridge 30 and after winding extends across the intermediate portion 22 to the final film roll 100. Film transport 88 is stopped before an excessive strain is placed on the trailing portion 42. This may be done in a variety of ways. For example, a sensor (not shown) can detect an increased load on the film transport 88 due to reaching the trailing portion 42; or count rotation of the film spool 34 or another rotating part; or track the length or area of filmstrip 12 traveling to the film roll; or film can be wound for a predetermined time. With any of these approaches a slip clutch (not shown) can be provided in the film transport 88 to accommodate excessive strain.

At this time, the apparatus components such as the upper capstan roller 92, shown in FIGS. 1a–1c, can be moved to a non-use position, relative to the camera frame assembly 14, which is then moved along for further processing. In embodiments of the invention having a film bridge 86, the camera frame assembly 14 is first displaced relative to the film bridge 86, and slack in the filmstrip 12 is taken up by retracting that filmstrip 12 portion back into the cartridge 30 or driving that filmstrip 12 portion forward with a driven roller (not shown) or the like.

After the film transport 88 is moved away from the camera frame assembly 14, the rear opening 28 of the camera frame assembly 14 is light-tightly closed. Referring now to FIG. 14, in a particular embodiment of the invention, this is accomplished by placing a light-tight rear cover 154 over the chambers 18,20 and intermediate section 22 and a light-tight front cover 156 over the camera frame assembly 14. The resulting camera assembly can be a completed camera or can be completed in other assembly operations. In addition to the features already discussed, including a film cartridge 30 and film roll 100, the camera can also include other conventional camera features well known to those of skill in the art.

The overstressing of the scroll former 26 can occur automatically as a part of formation of the film scroller 100. If not, the film roll can be treated, before, during, or after completion of assembly. An example of such a treatment is artificially aging the scroll former, this could be accomplished by heating the completed camera for a time period sufficient to cause the scroll former to overstress and inelastically deform.

The invention has been described in detail with particular reference to certain preferred embodiments thereof, but it will be understood that variations and modifications can be effected within the spirit and scope of the invention. cl PARTS LIST
apparatus 10
filmstrip 12
frame assembly 14
throat 15
frame 16
throat 17
cartridge chamber 18
supply space 19
supply chamber 20
end walls 21
intermediate section 22
sidewall 24
scroll former 26
rear opening 28
cartridge 30
canister 32
spool 34
leading portion 38
free end 40
trailing portion 42
main portion 44
free end 46
fixed end 48
guide portion or guide 49
first projection 50
axis 51 (of film cartridge spool)
second projection 52
inner surface 53
main section 56
exposure system 58
film engagement member 60
receiver 62
innermost turn 63
component 64
terminal part 65
active and rest positions 64a and 64b
pallet or nest 66
hollow core 67
Indexing features 68
movement system or positioner 70
stations 72
actuation mechanism 74
double-headed arrow 75
cartridge mover 76
active and rest positions 76a, 76b
vacuum gripper 78
active light lock opener 80
spool rotator 82
film path 84
film bridge 86
capstan 87
film transport 88
nip 90
first and second capstan rollers 92,94
endless belt 98
film roll 100
film roll space 102
initial roll space 102a
final roll spaces 102b
belt drive 104
idlers 106
vacuum-compressed gas unit 108
turtleback 112
friction reducing features 113
arrows 140,142.
rear cover 154
front cover 156
arrows 172,174
groundings line 175
layer of coating 201

What is claimed is:

1. A method for loading a filmstrip into a housing, comprising the steps of:
   propelling the filmstrip into said housing;
   during said propelling, curling the filmstrip into a roll within a scroll former;
   during said curling, applying with said scroll former a first compressive force against said roll;
   overstressing said scroll former; and
   after said overstressing, applying with said scroll former a second compressive force against said roll, said second force being less than said first force.

2. The method of claim 1 wherein said overstressing is during said curling.

3. The method of claim 1 wherein said housing is a camera frame assembly.

4. The method of claim 1 wherein said overstressing is aging said scroll former.

5. The method of claim 1 wherein said propelling step further comprises transporting film from a housing.

6. The method of claim 5 wherein said housing is a film cartridge.

7. The method of claim 1 wherein said scroll former is electrically grounded.

8. A method for reloading a used filmstrip housing, comprising the steps of:
   removing a used scroll former, said used scroll former having an inside surface defining a cylindrical final film space;
   installing a replacement scroll former, said replacement scroll former having an inside surface defining a cylindrical initial film space smaller than said final film space;
   propelling a filmstrip into the housing;
   during said propelling, curling the film-strip into a roll within said replacement scroll former; and
   overstressing said replacement scroll former to provide a second said used scroll former, and
   gripping said roll with said second said used scroll former.

9. The method of claim 8 wherein said overstressing is during said curling.

10. The method of claim 8 wherein said housing is a one-time use camera frame assembly.

11. The method of claim 8 wherein said overstressing is aging said scroll former.

12. The method of claim 8 wherein said propelling step further comprises transporting film from a housing.

13. The method of claim 12 wherein said housing is a film cartridge.

14. The method of claim 8 further comprising: during said curling, applying with said replacement scroll former a first compressive force against said roll; and after said overstressing, applying with said replacement scroll former a second compressive force against said roll, said second force being less than said first force.

15. A film housing comprising:
- a body having a supply chamber and an intermediate section adjacent said supply chamber, said supply chamber defining a film space, said supply chamber having opposed first and second projections defining an opening communicating with said film space, said opening facing said intermediate section;
- a filmstrip having a rolled portion substantially disposed in said chamber;
- a resilient, band-shaped scroll former having opposed fixed and free ends, said fixed end being joined to said first projection at a midpoint of said supply chamber, said scroll former partially encircling and gripping said rolled portion of said filmstrip.

16. The film housing of claim 15 wherein said scroll former has a support portion and a coating having a lower coefficient of friction than said support portion.

17. The film housing of claim 15 wherein said scroll former includes a metallic layer.

18. A film loading assembly comprising the film housing of claim 15, a filmstrip source, and a film transport disposed to propel said filmstrip from said filmstrip source into said supply chamber.

19. A camera comprising a film exposure system and the film housing of claim 15.

20. The film housing of claim 15 wherein said rolled portion has an inner turn and an outer turn, and said scroll former has a curved inside surface closely adjoining a portion of said outer turn of said rolled portion, said scroll former being sufficiently resilient to grip said rolled portion and insufficiently resilient to retract into a relaxed configuration defining a curve mappable on said inner turn.

21. The film housing of claim 20 wherein said projections overlap.

22. The film housing of claim 15 wherein said projections overlap.

23. The film housing of claim 15 wherein said body has a cartridge chamber and said intermediate section is disposed between said chambers.

24. The film housing of claim 15 wherein said rolled portion being completely transportable through said opening for use of said filmstrip.

25. A method for reloading a used filmstrip housing, comprising the steps of:
- removing a used scroll former;
- installing a replacement scroll former;
- propelling the filmstrip into the housing;
- during said propelling, curling the filmstrip into a roll within said replacement scroll former;
- during said curling, applying with said replacement scroll former a compressive force against said roll;
- overstressing said scroll former; and
- following said overstressing, applying with said replacement scroll former a reduced compressive force against said roll.

26. A method for loading a filmstrip housing, comprising the steps of:
- removing a used scroll former, said used scroll former having an end fixed to the housing, an opposed free end, a continuous main section between said ends, and a curvature of less than one turn;
- installing a replacement scroll former, said replacement scroll former having an end fixed to the housing, an opposed free end, a continuous main section between said ends, and a curvature in excess of one turn;
- propelling a filmstrip into the housing;
- during said propelling, curling the filmstrip into a roll within said replacement scroll former; and
- overstressing said replacement scroll former to provide a second said used scroll former; and
- gripping said roll with said second said used scroll former.

* * * * *